P. KUTCHAN.
HAY CURING FRAME.
APPLICATION FILED MAR. 29, 1911.
1,003,921.
Patented Sept. 19, 1911.
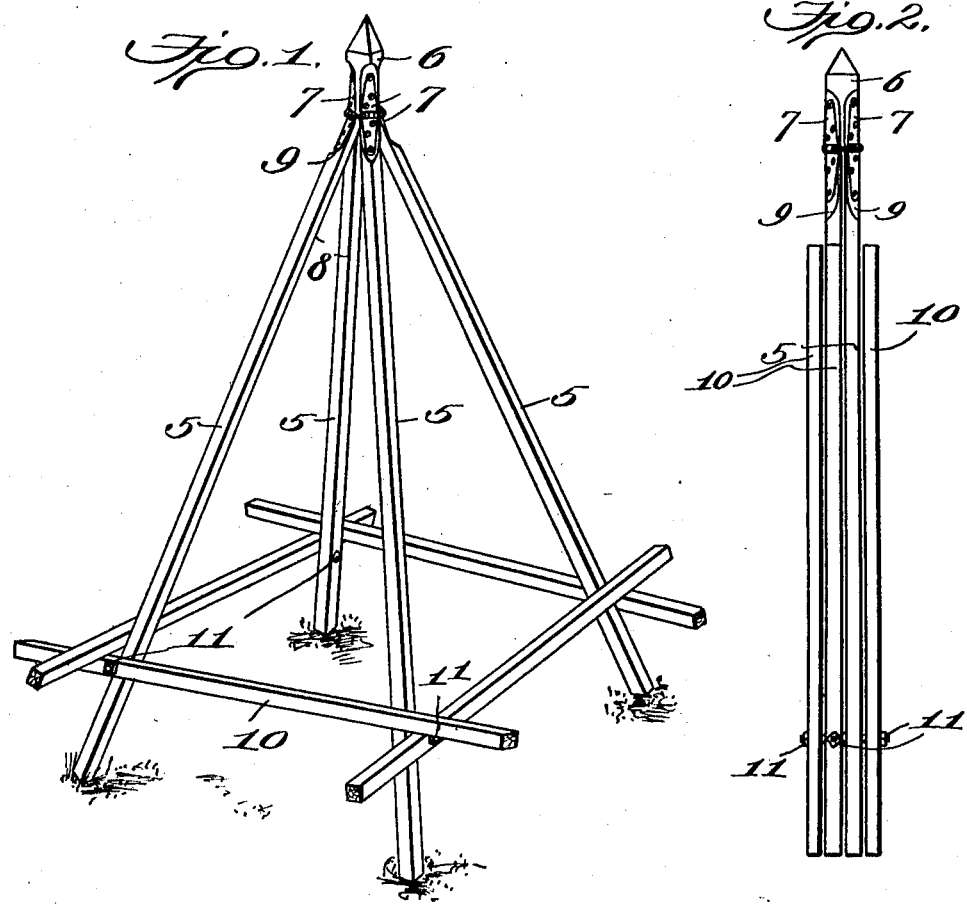
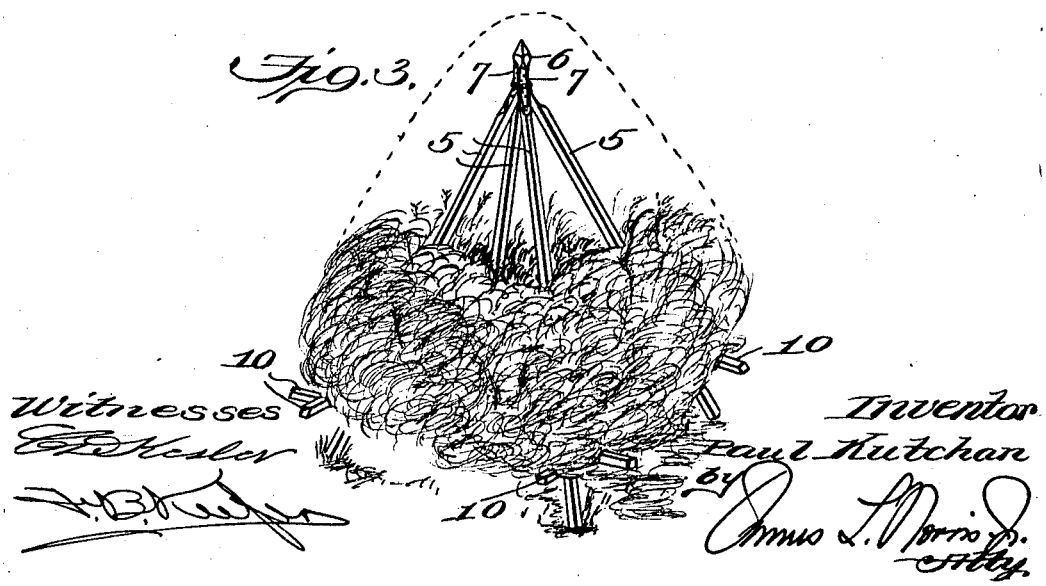

UNITED STATES PATENT OFFICE.

PAUL KUTCHAN, OF NEAR PETERSBURG, VIRGINIA.

HAY-CURING FRAME.

1,003,921.     Specification of Letters Patent.     Patented Sept. 19, 1911.

Application filed March 29, 1911. Serial No. 617,579.

*To all whom it may concern:*

Be it known that I, PAUL KUTCHAN, a citizen of the United States, residing near Petersburg, in the county of Dinwiddie and State of Virginia, have invented new and useful Improvements in Hay-Curing Frames, of which the following is a specification.

This invention relates to a curing frame for different kinds of hay and grain of a readily portable character and adapted to be used in a field to receive the hay or grain as it is cut, and the primary object of the same is to provide a simple and effective folding frame for the purpose specified which can be readily set up in operative position for use at any point desired, and collapsed and stored in compact form, the hay or grain when applied to the frame permitting a free circulation of air upwardly therethrough from the bottom of the stack thus formed as well as around the exterior of the hay or grain to expedite the drying out of the latter.

A further object of the invention is to preserve hay or grain after it has been cut through wet weather by disposing the hay or grain above the ground surface and thus encourage a thorough ventilation or drying out without injury to the hay or grain of whatever nature it may be.

With these and other objects and advantages in view the invention consists in the construction and arrangement of the several parts which will be more fully hereinafter described and claimed.

In the drawing: Figure 1 is a perspective view of a curing frame embodying the features of the invention and shown arranged in position to receive hay or grain. Fig. 2 is an elevation of the frame shown collapsed or folded. Fig. 3 is a perspective view of the frame showing the manner of applying the hay or grain thereto.

The improved frame comprises essentially four main supporting members or legs 5, preferably constructed from strips of material which for convenience in association, in a manner which will be presently explained, are square or rectangular in cross-section. The supporting members or legs 5 are hinged at their upper ends to a head piece 6 by means of suitable strap or other hinges 7, the members or legs being so associated with the head piece that one face 8 of each will be disposed inwardly, the upper extremity of each member or leg 5 being cut away or recessed through the one angular edge as at 9 to receive the lower leaf of the hinge 7 connected thereto, so that when the pairs of members or legs are folded they will come together with inner opposing sides or edges adjacent and practically produce a square device. This particular disposition of the main members or legs 5 insures the production of a quadrangular frame when the members or legs are opened, and, furthermore, the particular arrangement of the hinges 7 at the upper extremities of the members or legs and the association of the latter with the head piece 6 provide a strong and durable structure by avoiding penetration or engagement of intermediate portions of the legs with pivot devices and the members or legs are permitted to freely move throughout their full length in setting up the frame for use or collapsing the same into compact form for transportation or storage. On the outer side of each member or leg 5 near the lower extremity a straight supporting or prop bar 10 is pivotally secured as at 11 by means of a suitable bolt or analogous device. The distance between the pivot bolt or analogous device 11 and the adjacent free end of each support or prop bar 10 is exactly equal to the distance between the point of engagement of said bolt with the member or leg 5 and the adjacent free end of the latter which is adapted to rest on the ground surface, and each supporting or prop bar 10 is applied to the outer side of its member or leg so that when the supporting or prop bar is folded it will lie flat against the said side of the member or leg and produce a compact folding frame. The intermediate disposition of the fulcrum devices for the supports or prop bars 10 provides each of the latter with a long and a short arm for a purpose which will be presently more fully explained.

By pivotally attaching the supporting or prop bars 10 in the manner just explained, means are provided for producing an interlock between the pivoted and free extremities of the said bars, and it will be observed that when each bar is turned down into approximately horizontal position after the main members or legs 5 are spread apart, the pivoted extremities of said bars will project outwardly beyond their respective members or legs 5; and to set up a locking or stable support of the frame as an entirety, the main members or legs are opened to such an extent as to have the long arm of each bar 10 extend beyond the short arm of the bar with which it coöperates at about the same distance as the said short arm of the pivoted bar, and in setting up the frame for use the long arm of each bar 10 is applied over the upper edge of the short arm of a companion bar at right angles to the latter and close to the main member or leg to which said pivoted bar is attached, and by thus regularly disposing the bars 10 a strong resistance ensues to the collapse of the frame. When the bars 10 have been properly arranged, the parts of the frame will have the arrangement shown by Fig. 1, and after the frame has thus been set up the hay or grain is applied thereto, as shown by Fig. 3, and a stack is gradually built up over and incloses the frame, the crossed arms of the bars 10 serving as a base support for the hay or grain and leaving the interior of the frame and the stack practically open to permit the air to circulate under and upwardly through the stack as well as around the exterior thereof and thereby quickly and effectively dry out the hay or grain on the frame in the event that the hay or grain is wet. When the stack is properly formed over the frame it will be held in stable condition and when desired may be removed and loaded into a vehicle for transportation. When the frame is not in use it may be readily folded or collapsed as shown by Fig. 2 and thus materially reduced, with advantages in transportation and storage.

The frame may be used for curing any kind of hay or grain, and any suitable material, preferably wood, may be used in the construction of the several parts. It will also be understood that changes in the proportions, dimensions and minor details of construction may be adopted without departing from the spirit of the invention.

What is claimed as new is:

A curing frame of the class specified comprising a plurality of supporting legs, the upper extremity of each leg being recessed through one angular edge; a head piece, strap hinges having portions thereof seated in the recesses and secured to the legs and the remaining portions applied and secured to the head piece, the legs being so disposed that when they are folded they will come together with inner opposing edges adjacent and practically produce a square device, and a prop bar intermediately pivoted and secured to each leg to provide a short arm and a long arm, the several prop bars being applied to and foldable on outer sides of the legs and also adapted to have the short arm of each bar supporting the long arm of the next bar in series when the device is in position for use, the prop bars when folded against the legs being disposed regularly around the latter to reduce the bulk of the folded device.

In testimony whereof I have hereunto set my hand in presence of two subscribing witnesses.

PAUL KUTCHAN.

Witnesses:
 A. D. HAMILTON,
 RUTH CHAPPELLE.

---

Copies of this patent may be obtained for five cents each, by addressing the "Commissioner of Patents, Washington, D. C."